Figure 1:
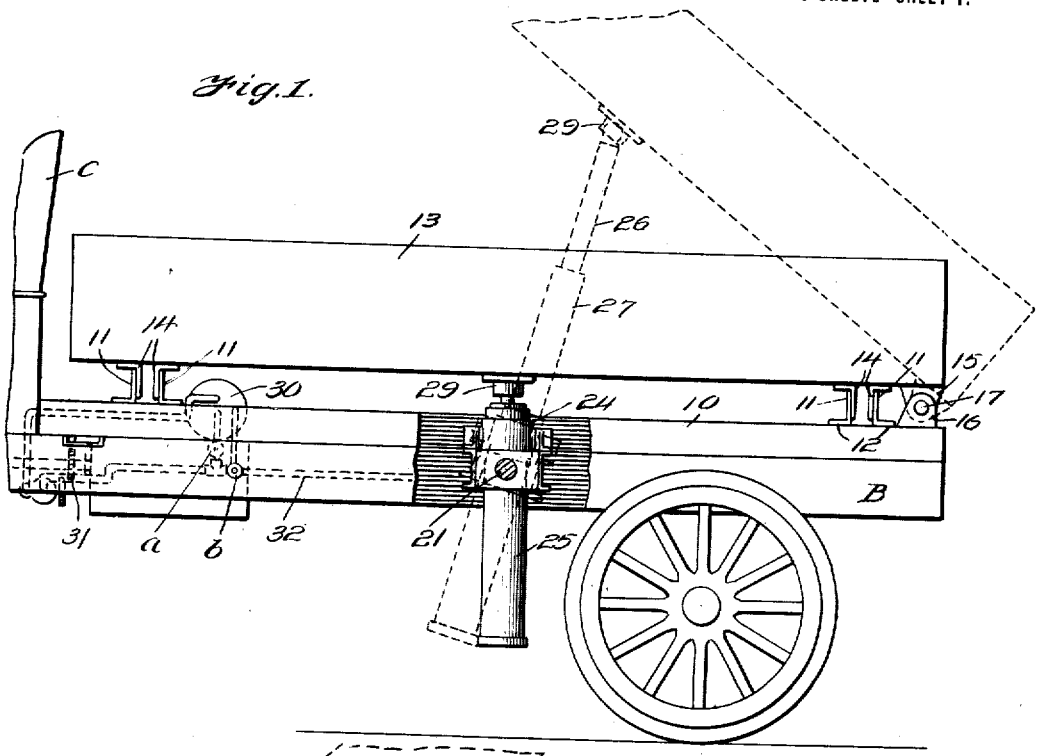

Nov. 13, 1928. G. W. BERRY. Re. 17,130

TILTING MECHANISM FOR DUMPING BODIES.

Original Filed April 3, 1920 3 SHEETS—SHEET 1.

Inventor
G. W. Berry.

By Geo. P. Kimmel
Attorney

Nov. 13, 1928. G. W. BERRY. Re. 17,130

TILTING MECHANISM FOR DUMPING BODIES.

Original Filed April 3, 1920

3 SHEETS—SHEET 2.

Inventor
G. W. Berry.

By Geo. P. Kimmel.
Attorney

Nov. 13, 1928. G. W. BERRY. Re. 17,130
TILTING MECHANISM FOR DUMPING BODIES.
Original Filed April 3, 1920
3 SHEETS—SHEET 3.
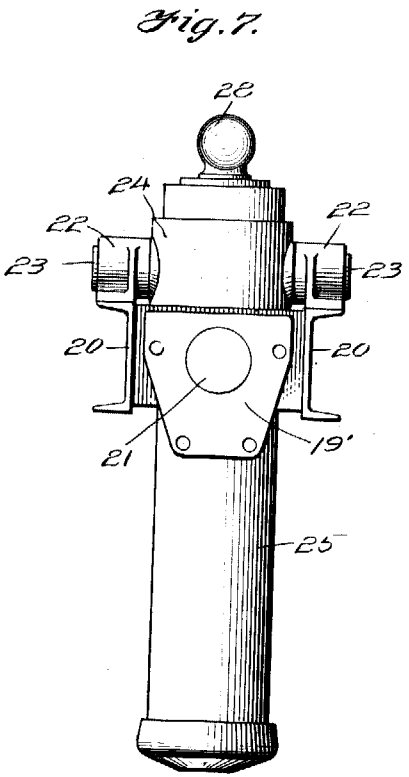
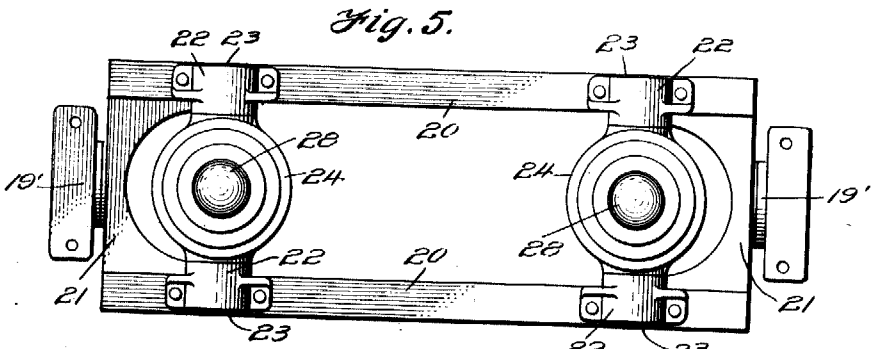
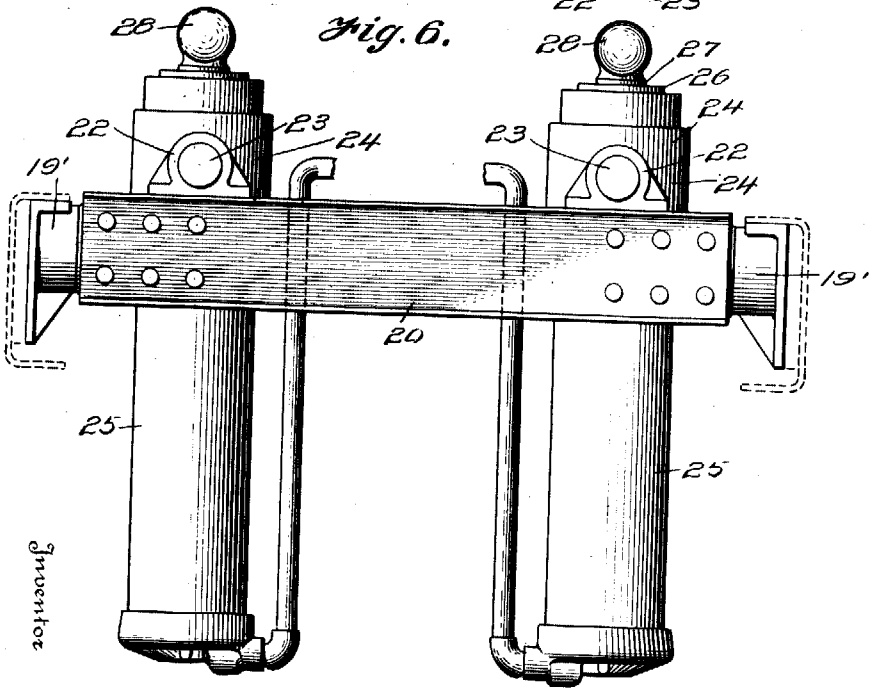
Inventor
G. W. Berry.
By Geo. P. Kimmel.
Attorney Reissued Nov. 13, 1928. Re. 17,130

UNITED STATES PATENT OFFICE.

GEORGE W. BERRY, DECEASED, LATE OF KANE, PENNSYLVANIA, BY THE U. S. HOIST & BODY COMPANY, ASSIGNEE, OF YOUNGSTOWN, OHIO.

TILTING MECHANISM FOR DUMPING BODIES.

Original No. 1,392,107, dated September 27, 1921, Serial No. 371,045, filed April 3, 1920. Application for reissue filed February 10, 1928. Serial No. 253,493.

The invention relates to a tilting mechanism for dumping bodies and more particularly to the class of operating mechanism for dumping bodies of motor vehicles and mechanism for effecting the tilting action thereof.

The primary object of the invention is the provision of a tilting mechanism for tilting bodies, wherein the same is adapted for support upon the truck frame of a vehicle, so that the body can be tilted rearwardly or to either side of the truck frame, the mechanism for effecting the tilting of said body being disposed and arranged in a novel manner so that said mechanism is under the control of the operator of the truck and on raising of the body the same can be brought to a maximum tilting position or at any angle intermediate of the normal position of said body and the maximum raised position thereof.

Another object of the invention is the provision of a tilting mechanism for dumping bodies, wherein the same has connection with hydraulic mechanism, suspended for free swinging movement laterally and longitudinally within the truck frame of a vehicle and is so connected with said body that the latter can be raised under fulcrum action at an intermediate point thereof, so that the body may swing from one end or from either side thereof for the tilting of the body to effect end dumping or side dumping.

A further object of the invention is the provision of a tilting mechanism for dumping bodies, wherein the hoisting mechanism therefor includes one or a plurality of hydraulic jacks having telescopically arranged pistons operable for imparting the requisite tilting movement to the body for end or side dumping, the jack or jacks being located and suspended in the truck frame to afford the necessary road clearance and to maintain the body when in normal loading position close to the truck frame, thereby enabling the convenient loading of the body when in its normal position.

A still further object of the invention is the provision of a tilting mechanism for dumping bodies, wherein on the raising of said body upon the wheeled truck, the hydraulic mechanism automatically adjusts itself to compensate for the angular disposition of said body in the raising movements thereof, to eliminate any possible binding action and to assure the required dumping movement with despatch.

A still further object of the invention is the provision of a tilting mechanism for dumping bodies, wherein the mounting thereof for its swinging movement to effect the end and side dumping eliminates the use of cranes, hoisting cables and other appurtenances as are ordinarily employed for bringing the body to dumping position or the lowering thereof, as well as dispensing with levers and other like equipment, the said body being supported when in its normal position upon the truck frame to evenly and uniformly distribute the load relative to the wheel base of the vehicle, and at the same time affords maximum load capacity with a minimum wheel base.

A still further object of the invention is the provision of a tilting mechanism for dumping bodies, having the mechanism for the raising and lowering thereof, located entirely beneath said body so as to be out of the way to avoid any possible injury in the operation of the body, yet said mechanism is readily and conveniently accessible for the purpose of inspection or repairs.

A still further object of the invention is the provision of a tilting mechanism of this character, which is adaptable for use with standard types of tilting bodies.

Other objects of the invention will be in part obvious and in part hereinafter pointed out.

Figure 2:
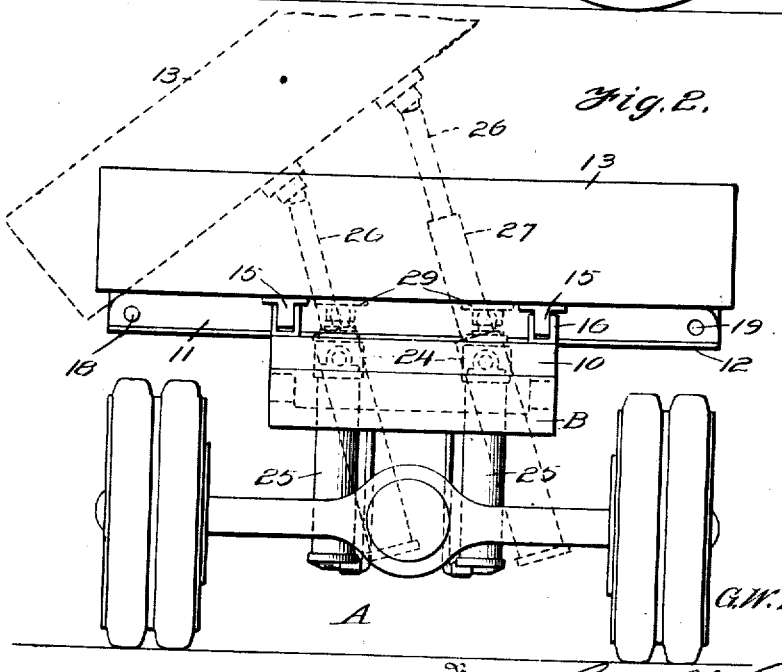
Figure 3:
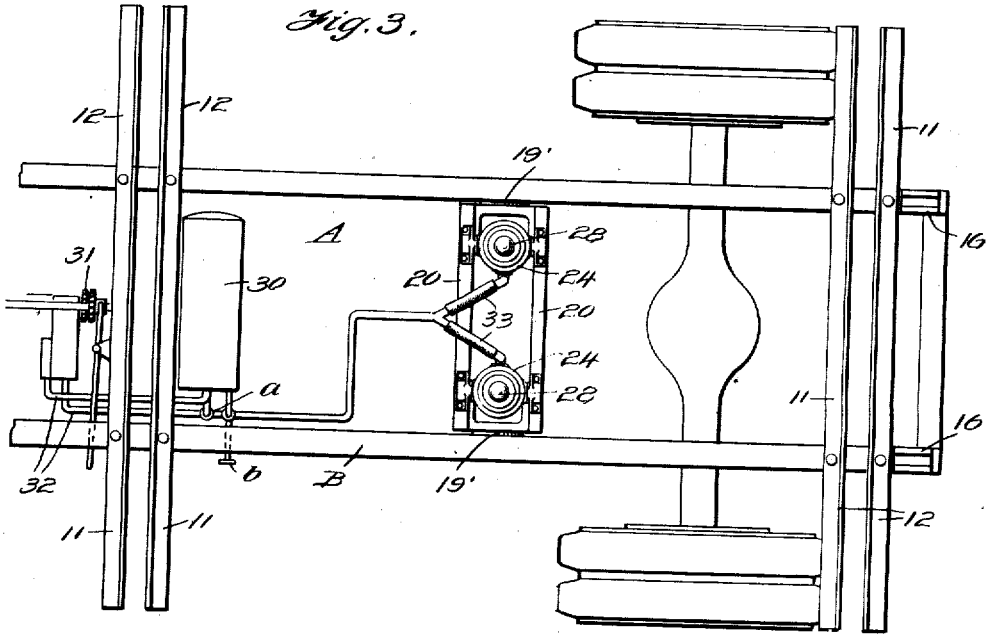
Figure 4:
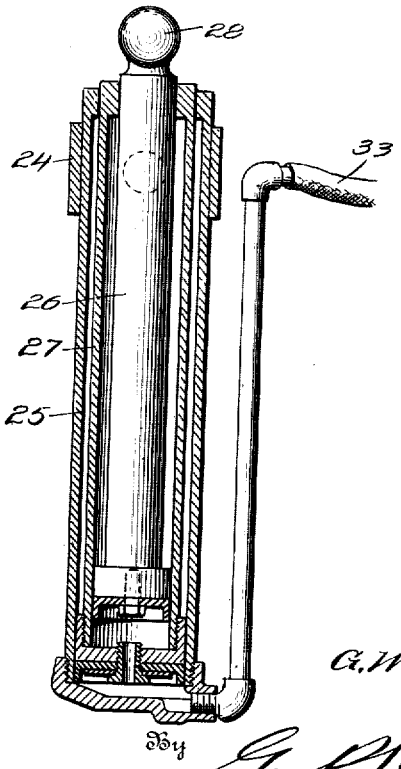

The invention accordingly consists in the features and arrangement of parts, the construction of which will be exemplified in the detailed description hereinafter set forth and the scope of the application will be clearly defined in the claims hereunto appended. In the accompanying drawings:

Figure 1 is a fragmentary side elevation of a truck, the same being partly broken away, showing by full lines the loading position of its body and by dotted lines, the rear end dumping position thereof with the automatic dumping mechanism construction in accordance with the invention applied, Figure 2 is a rear elevation showing by full lines, the truck body in normal loading position and by dotted lines in side tilting position, Figure 3 is a fragmentary top plan view showing the body of the truck removed and hydraulic jacks detached from said body and associated with the fluid pumping and circulating system, Figure 4 is an enlarged vertical sectional elevation through one of the hydraulic jacks detached from the body of the truck, Figure 5 is an enlarged top plan view showing the mounting for the hydraulic jacks detached from the chassis of the truck, Figure 6 is an elevation thereof showing the mounting in position relative to the chassis, the side sills of the latter being indicated by dotted lines, and Figure 7 is an end elevation of the mounting detached.

Similar reference characters indicate corresponding parts throughout the several views in the drawings.

Referring to the drawings in detail, A designates generally, a conventional form of motor truck having suitably mounted on its chassis B, rearwardly of the front seat C, a supporting bed including a substantially rectangular shaped frame 10, superimposed upon the side beams of the chassis B and fastened thereto in any suitable manner. Arranged upon the bed constituted by the frame 10 transversely of its side beams near the front and rear ends thereof are pairs of spaced parallel angle bars 11 which are of a required length to extend beyond opposite sides of the frame 10 to overhang the wheels of the motor truck, the base flanges 12 of said angle bars being suitably secured to the frame 10 to form a rigid part thereof for the mounting of the tilting or dumping body 13, which is of any conventional form and of any load capacity, the mounting of said body 13 being hereinafter fully described.

Secured to the bottom of the body 13, near opposite ends thereof are pairs of spaced parallel angle bars 14, the same being secured to said body in any suitable manner and are properly spaced in pairs transversely of the body to loosely fit between the angle bars 11 on the bed frame 10 and these bars 14 are coextensive with the bars 11, while at the rear end of the body 13 are bearing brackets 15, preferably in the form of ears to fit within furcated keepers 16 mounted at the rear end of the bed frame 10, the ears 15 and keepers 16 being formed with suitable holes for accommodating removable pivot pins 17 so that when the bearings 15 are pivoted in the keepers 16, the body 13 can be raised from a forward point on the pivot pins 17 which constitute the fulcrums therefor for the tilting of the body to bring the same to a rear-end dumping position.

Mounted in the pairs of angle bars 12 adjacent to opposite ends thereof are removable fulcrum pins 18, while the angle bars 14, adjacent to their ends are formed with openings 19 for accommodating the fulcrum pins 18, thus it being seen that the tilting body 13 can be rocked on the fulcrum pins 18 at either side of the base frame 10 for the side dumping of the body. It is to be understood of course, that the pivot pins 17 are removed from the bearings 15 and keepers 16 when the body 13 is to be tilted to one side or the other of the motor truck. Also it is necessary that the pins 18 on one side of the truck be removed when the body is to be tilted on the pins 18 at the other side thereof for the dumping of the body to this side of the truck and when the body 13 is to be tilted for rear-end dumping all pins 18 are removed and the said fulcrum pins 17 are inserted to connect the bearings 15 to the keepers 16 for pivotal movement. Suitably secured at the side beams of the chassis B at the required point spaced forwardly from the rear wheels of the motor truck are trunnion bearings 19′ while disposed transversely between the side beams of said chassis B is a rocking hanger, preferably including spaced parallel bars 20 joined at their ends with trunnions 21 which fit in the trunnion bearings 19′ and mounted upon said bars 20, contiguous to the trunnions 21 are trunnion bearings 22, having journaled therein the trunnions 23 at opposite points of embracing rings 24 in which are fixed the hydraulic jacks of the tilting mechanism hereinafter fully described.

The hydraulic jacks comprise a cylinder 25 supported in the ring 24 in any suitable manner and working within this cylinder are inner and outer telescoping pistons 26 and 27 respectively, the stem of the piston 27 constituting a fluid cylinder for the inner piston 26, said outer piston 27 being slidable in the cylinder 25, while the inner piston 26 slides within the outer piston 27 in the telescopic movement of the pistons. The inner piston 26 is formed with an outer ball terminal 28 engaged within a two-part ball socket member 29, which is suitably fastened to the under side of the body 13 so that a ball and socket connection is had between each hydraulic jack and the tilting body, it being preferable to employ two hydraulic jacks and by supporting the same in the rings 24, it will be clearly apparent that these jacks are free for oscillatory movement in directions both longitudinally and laterally of the motor truck.

By reason of the mounting of hydraulic jacks and the particular location thereof in the motor truck when said jacks are operated, the body 13 can be tilted for end dumping or side dumping, the jacks being operated in a manner presently described.

Suitably supported upon the chassis B of the motor truck A, preferably at the forward portion thereof is a fluid storage reservoir or tank 30 and the supply of fluid to the hydraulic jacks therefrom is effected by suitable pumping mechanism adapted to be thrown into gear with, and out of gear from the transmission mechanism of the motor truck, the pumping mechanism being conventionally shown at 31 and is under the control of the operator of the motor truck.

The pumping mechanism 31 is operatively connected with the tank or reservoir 30, which latter has communication through a circulating system 32, of any approved type, with the several hydraulic jacks so that the fluid under pressure can be delivered thereto for the extending of the telescopic pistons 26 and 27 thereof, to effect the tilting of the body 13 for end and side dumping. The fluid supply from the reservoir or tank 30 is operated and controlled in any suitable manner so as to properly actuate the hydraulic jacks, whereby the tilting body 13 will be raised and lowered thereby. The fluid circulating mechanism for the hydraulic jacks includes suitable flexible connections 33, to permit the longitudinal and lateral swinging movement of said jacks in the tilting operation of the body 13 of the motor truck.

It is to be clearly understood that the fluid circulating mechanism and the pumping mechanism may be of any conventional or well-known construction having included therein any approved form of automatic relief valve *a* and hand operated regulating valve *b* for the circulation of the fluid and the control thereof in the automatic operation of the hydraulic jacks, the salient features of the present invention being related solely to the disposition, the construction and the arrangement of the hydraulic jacks in the chassis of the motor truck and the construction and arrangement of the tilting body 13 and the connection of the jacks therewith.

While any conventional or well known fluid circulating and pumping mechanism may be employed, it is desirable that the connection between such mechanism and the fluid cylinder be as shown in the drawings, particularly Figure 4. The flexible hose members 33 permit of swinging or rocking of the jacks and are located adjacent the top of the jack cylinders, being connected to the bottom of the cylinders by an upstanding pipe, as shown. With this arrangement the hose members are adjacent the trunnion mounting, and flexing of the hose members is thus reduced to a minimum. At the same time the upstanding pipe connection insures that even when the jacks are in their lowered position, they will contain a substantial quantity of oil or other fluid. This reduces the necessity for a large supply tank and insures rapid initiation of the hoisting operation.

What is claimed is:

1. The combination with a supporting frame, of a tilting body, changeable connections between the frame and body for selective side or end tilting of the latter, jacks disposed intermediate the ends of said frame and spaced apart and removed from and at opposite sides of the longitudinal center of the frame, a swivel connection between each of the jacks and the body, and supports for the jacks to permit lateral and longitudinal swinging movements thereof.

2. The combination with a body adapted to be supported for tilting movement in the direction of one end and opposite sides thereof, of telescopic, hydraulic jacks, spaced apart and disposed intermediate of the ends of said body, beneath the same, means supporting said jacks and coacting therewith to permit lateral and longitudinal swinging movements of said jacks beneath said body, and connections between the jacks and said body to permit the tilting of the body either endwise or sidewise to opposite sides thereof.

3. The combination with a bed, of a rocking hanger in said bed, a jack movably supported in the rocking hanger and adapted for swinging movement about an axis substantially at right angles to the axis of movement of said hanger, a body carried by the bed and supported thereon for end or side tilting movements, a connection between said body and jack, and means for connecting the tilting body positively with the base when said body is raised endwise or sidewise.

4. The combination with a plurality of telescopic hydraulic jacks, of a body superposed relative to said jacks and supported for tilting movement either endwise or sidewise relative to the jacks, means located intermediate the ends of the chassis for carrying the jacks in spaced relation with respect to each other and permitting lateral and longitudinal swinging movement, and ball and socket connections between the body and jacks.

5. The combination with a supporting frame of a tilting body, a plurality of hydraulic jacks disposed intermediate the ends of the frame beneath the tilting body, means fixed to the frame for supporting the jacks in spaced relation to each other on opposite sides of the longitudinal center of said frame, and constructed and arranged to permit lateral and longitudinal swinging movements of said jacks, ball and socket connections between the tilting body and said jacks and means forming pivotal axes for the body to permit selective side or end tilting thereof.

6. In tilting mechanism for vehicle bodies, a support adapted for mounting upon the chassis of a motor vehicle, trunnion bearings arranged intermediately upon said support, a rocking hanger disposed transversely of the support and having trunnions engaging the trunnion bearings, second trunnion bearings mounted upon the rocking hanger and arranged in pairs on opposite sides of the longitudinal center of said support, swinging members engaged in the second bearings and disposed for movement about axes substantially at right angles to the axis of movement of the rocking hanger, hydraulic jacks carried in the swinging members and having telescopically assembled pistons, a body normally horizontally disposed upon the support and having connection with the pistons of the hydraulic jacks so that on the operation of the same the body will be moved to a selected lateral angular position or to a longitudinal angular position relative to said support.

7. The combination with a tilting dumping body, of a pair of spaced jacks constructed and arranged to be mounted within a support to be disposed on opposite sides of the longitudinal center of said support and at a point intermediate the ends of the body for longitudinal and lateral angular movements and having connection with the body whereby on actuating the jacks the said body can be tilted endwise or sidewise to either side thereof.

8. In combination, a wheeled truck chassis, a body superposed thereon and tiltably supported thereby, a jack engaging the body, and a jack support, the jack support being carried by the chassis intermediate the ends thereof and below the body and arranged to permit lateral and longitudinal swinging movement of said jack for the side and end dumping of the body.

9. In combination, a wheeled truck chassis, a body tiltably supported thereby, a jack engaging the body, a jack support, the jack support being carried by the chassis intermediate the ends thereof and arranged to permit lateral and longitudinal swinging movement of said jack upon dumping movement of the body, the jack being fluid operated, and a flexible conduit effective for maintaining fluid connection with the jack in its various positions.

10. In combination, a wheeled truck chassis, a body tiltably supported thereby, a jack engaging the body, a jack support, the jack support being carried by the chassis intermediate the ends thereof and arranged to permit lateral and longitudinal swinging movement of said jack upon dumping movement of the body, the jack being fluid operated, and a flexible conduit effective for maintaining fluid connection with the jack in its various positions, the flexible conduit making connection with the jack adjacent its upper end.

11. In combination, a wheeled truck chassis, a body tiltably supported thereby, a jack engaging the body, a jack support, the jack support being trunnioned in the chassis intermediate the ends thereof, and the jack being trunnioned in the support, the trunnions being so arranged as to permit lateral and longitudinal swinging movement of said jack upon dumping movement of the body, the hoisting jack being fluid operated, and a flexible conduit making connection with the jack adjacent the plane of the trunnion mounting.

12. In combination, a wheeled truck chassis, a body superposed thereon and tiltably supported thereby, a hoisting jack of the fluid actuated type engaging the body, a jack support, the jack support being carried by the chassis intermediate the ends thereof and below the body and arranged to permit lateral and longitudinal swinging movement of the jack upon dumping movement of the body, fluid pumping mechanism carried by the chassis, and fluid connections permitting said lateral and longitudinal swinging of the jack.

13. In combination, a wheeled truck chassis, a body tiltably supported thereby, a hoisting jack of the fluid actuated type engaging the body, a jack support, the jack support being carried by the chassis intermediate the ends thereof and arranged to permit lateral and longitudinal swinging movement of the jack upon dumping movement of the body, fluid pumping mechanism carried by the chassis, and fluid connections permitting said lateral and longitudinal swinging of the jack, the fluid pumping mechanism making connection with the jack structure adjacent the top thereof, whereby a quantity of fluid is retained in the jack at all times.

THE U. S. HOIST & BODY COMPANY,
By C. P. GALANOT, *President*,
*Assignee of George W. Berry, Deceased.*

DISCLAIMER

Re. No. 17,130.—*George W. Berry*, deceased, late of Kane, Pa. TILTING MECHANISM FOR DUMPING BODIES. Patent dated November 13, 1928. Disclaimer filed February 13, 1931, by the assignee, *The Commercial Shearing & Stamping Co.*

Hereby enters this disclaimer to any and all devices within the scope of said claims provided with a jack comprising a single piston reciprocating in a cylinder. Your petitioner thus restricts said claims to devices having a jack of the telescoping type.

[*Official Gazette March 3, 1931.*]